(12) United States Patent
Whelan et al.

(10) Patent No.: US 9,315,099 B2
(45) Date of Patent: Apr. 19, 2016

(54) FUEL FILL APPARATUS FOR USE WITH FUEL TANKS

(75) Inventors: Sean Whelan, Grand Ledge, MI (US); Anthony Slabaugh, Belmont, MI (US); Christopher Bostwick, Rockford, MI (US)

(73) Assignee: BRUNSWICK CORPORATION, Lake Forest, IL (US)

( * ) Notice: Subject to any disclaimer, the term of this patent is extended or adjusted under 35 U.S.C. 154(b) by 477 days.

(21) Appl. No.: 13/564,388

(22) Filed: Aug. 1, 2012

(65) Prior Publication Data

US 2014/0034638 A1 Feb. 6, 2014

(51) Int. Cl.
*B60K 15/04* (2006.01)

(52) U.S. Cl.
CPC ......... *B60K 15/04* (2013.01); *B60K 2015/0458* (2013.01)

(58) Field of Classification Search
CPC ............. B60K 2015/049; B60K 15/04; B60K 2015/0458
USPC ................. 141/286, 308, 312, 372, 348–350; 220/86.2
See application file for complete search history.

(56) References Cited

U.S. PATENT DOCUMENTS

| | | | | | |
|---|---|---|---|---|---|
| 1,589,500 | A | * | 6/1926 | Wilcox | 220/86.2 |
| 1,966,350 | A | * | 7/1934 | Kronquest | 222/86 |
| 3,979,010 | A | * | 9/1976 | Fiedler et al. | 220/86.2 |
| 4,171,750 | A | * | 10/1979 | Hundemer | 220/86.2 |
| 4,300,699 | A | * | 11/1981 | Anhegger | B60K 15/04 137/588 |
| 5,271,438 | A | * | 12/1993 | Griffin et al. | 141/59 |
| 5,431,199 | A | * | 7/1995 | Benjay et al. | 141/59 |
| 5,732,840 | A | * | 3/1998 | Foltz | 220/86.2 |
| 5,839,489 | A | * | 11/1998 | Ganachaud et al. | 141/382 |
| 5,944,075 | A | * | 8/1999 | Turner et al. | 141/348 |
| 6,405,767 | B1 | * | 6/2002 | Marsala et al. | 141/286 |
| 6,648,033 | B2 | * | 11/2003 | Gabbey et al. | 141/286 |
| 6,766,838 | B1 | * | 7/2004 | Zywicki | 141/286 |
| 6,872,109 | B2 | * | 3/2005 | Nagata et al. | 440/88 F |
| 6,886,613 | B1 | * | 5/2005 | Zahdeh | 141/286 |

(Continued)

FOREIGN PATENT DOCUMENTS

EP 0659603 A1 6/1995

OTHER PUBLICATIONS

International Searching Authority, "International Search Report", issued in connection with International Application No. PCT/US2013/050496, mailed on Nov. 15, 2013, 4 pages.

(Continued)

*Primary Examiner* — Mark A Laurenzi
*Assistant Examiner* — Andrew StClair
(74) *Attorney, Agent, or Firm* — Hanley, Flight & Zimmerman, LLC

(57) ABSTRACT

Fuel fill apparatus for use with fuel tanks are described. An example fuel fill apparatus includes a body to removably couple to a neck of a fuel tank. The body has an opening to receive a fuel nozzle and guide liquid fuel from the fuel nozzle to a cavity of the fuel tank. A nozzle retainer retains the fuel nozzle in the opening. A positioner in the opening offsets the fuel nozzle relative to a central axis of the opening such that an aspirator of the fuel nozzle is positioned adjacent an inner wall of the opening when the fuel nozzle is inserted in the opening. The positioner maintains a fuel nozzle outlet opening substantially parallel relative to a central axis of the opening during a fueling event.

18 Claims, 10 Drawing Sheets

(56) References Cited

U.S. PATENT DOCUMENTS

| | | | |
|---|---|---|---|
| 7,028,727 B1* | 4/2006 | Blair | 141/349 |
| 7,073,681 B2* | 7/2006 | Abe et al. | 220/375 |
| 7,089,975 B2* | 8/2006 | Chrisco et al. | 141/286 |
| 8,857,643 B2* | 10/2014 | Fetzer | 220/86.2 |
| 2003/0116202 A1* | 6/2003 | Krishnamoorthy et al. | 137/593 |
| 2006/0037648 A1* | 2/2006 | Krishnamoorthy | B60K 15/04 137/592 |
| 2006/0086404 A1* | 4/2006 | Wu | 141/59 |
| 2009/0194198 A1* | 8/2009 | Bar et al. | 141/349 |
| 2009/0250468 A1* | 10/2009 | Whelan et al. | 220/371 |

OTHER PUBLICATIONS

International Searching Authority, "Written Opinion of the International Searching Authority", issued in connection with International Application No. PCT/US2013/050496, mailed on Nov. 15, 2013, 4 pages.

Canadian Intellectual Property Office, "Office Action", issued in connection with Application No. 2,879,866, Nov. 30, 2015, 3 pages.

European Patent Office, "Communication pursuant to Rules 161(1) and 162 EPC", issued in connection with European Patent Application No. 13745225.6, on Mar. 13, 2015, 2 pages.

* cited by examiner

FUEL FILL APPARATUS FOR USE WITH FUEL TANKS

FIELD OF THE DISCLOSURE

The present disclosure relates generally to fuel systems and, more particularly, to fuel fill apparatus for use with fuel tanks.

BACKGROUND

A fuel system of a marine vehicle typically includes a fuel fill apparatus fluidly coupled to a fuel tank. In some examples, the fuel fill apparatus is directly coupled to or formed with the fuel tank (e.g., a direct fill tank) and includes an opening for receiving a nozzle such as, for example, a nozzle of a fuel pump. As the fuel tank is being filled, fuel vapors in the fuel tank are displaced and vented from the fuel tank to equalize the pressure within the fuel tank via, for example, a venting system and/or the opening of the fuel fill apparatus. However, in some instances, displaced fuel vapors may cause liquid fuel to expel onto a surface of the marine vehicle and/or overboard through the opening of the fuel fill apparatus.

Government agencies (e.g., the Environmental Protection Agency) have enacted regulations to regulate marine fuel systems. More specifically, government regulations (e.g., title 40 of the Code of Federal Regulations) currently do not allow any expulsion of liquid fuel by boats and other marine vehicles during a fueling event.

DETAILED DESCRIPTION

Figure 1:
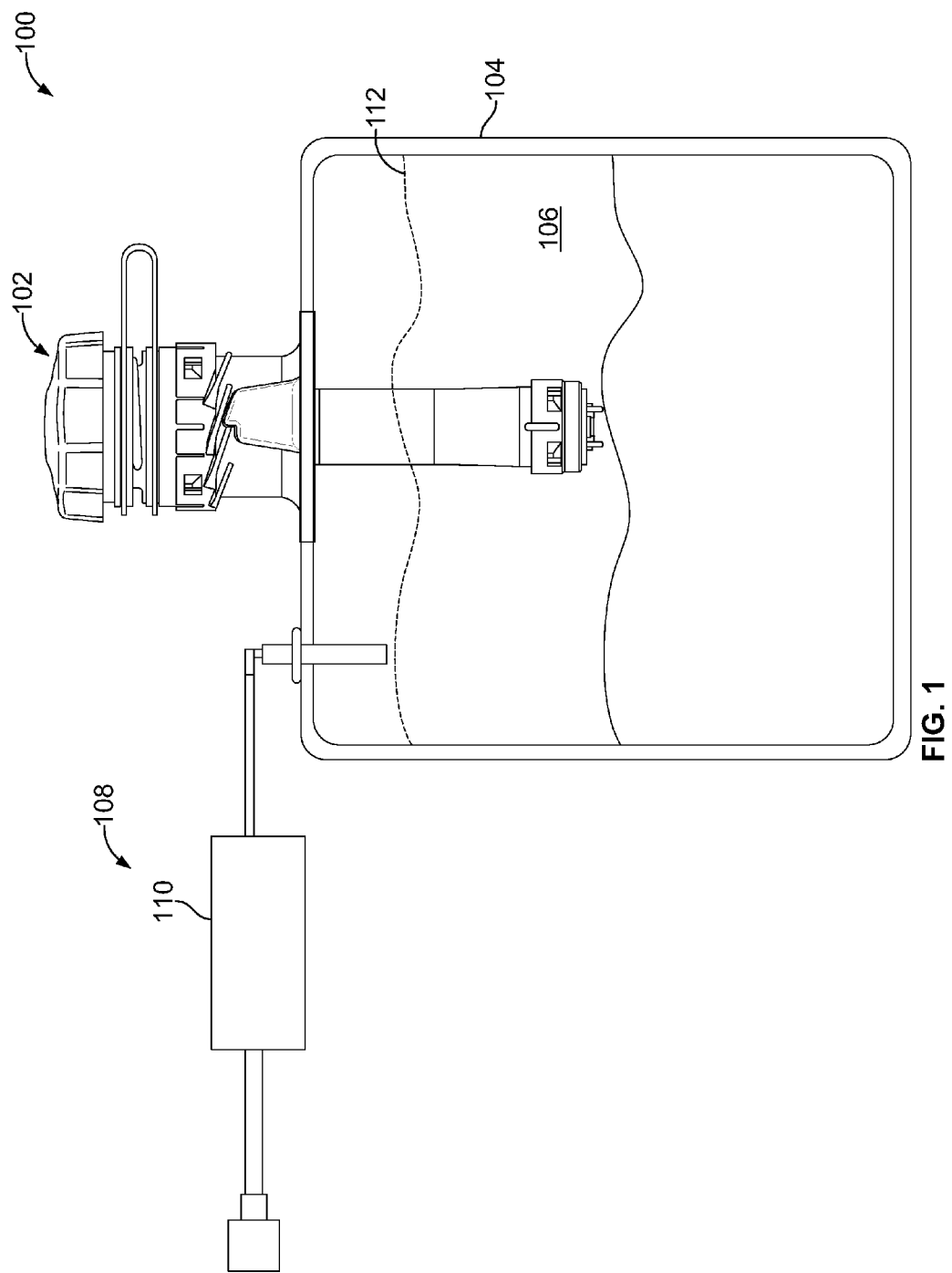
FIG. 1 is schematic representation of an example fuel delivery system having an example fuel fill apparatus in accordance with the teachings disclosed herein.

Example fuel fill apparatus disclosed herein may be used with fuel tanks for use with marine crafts or vehicles. The example fuel fill apparatus disclosed herein may be used with portable fuel tanks and/or fuel tanks permanently fixed to a marine vehicle. In particular, the example fuel fill apparatus disclosed herein is an insert or adaptor that may be coupled to existing fuel tanks. An example fuel fill apparatus disclosed herein may be an insert or adaptor mountable (e.g., may be threadably coupled or welded) to a fuel neck of a fuel tank. For example, an example insert disclosed herein may include an opening to receive a fuel nozzle. The opening defines a passageway between a first end of the fuel neck and a second end of the fuel neck to fluidly couple the fuel nozzle to a cavity of the fuel tank. Additionally or alternatively, the passageway positions (e.g., offsets) the fuel nozzle relative to the passageway when the fuel nozzle is received by the insert. For example, an example insert apparatus disclosed herein may be mounted to a standard marine tank thread size, a modified 2.25 inch buttress thread commonly used in marine fuel tanks, a 2.25 inch buttress thread commonly used in marine fuel tanks, a 2.25 inch thread commonly used in marine fuel tanks and/or any other suitable thread. In some examples, the example fuel fill apparatus or inserts disclosed herein may be welded (e.g. plastically welded) to a fuel neck of a fuel tank. In this manner, the example fuel fill apparatus disclosed herein do not require significant tooling changes used to manufacture existing fuel tanks, thereby significantly decreasing manufacturing costs.

Additionally or alternatively, the example fuel fill apparatus disclosed herein significantly reduce or prevent liquid fuel expulsion from an opening of the fuel fill apparatus during a refueling event. More specifically, the example fuel fill apparatus disclosed herein comply with certain government regulations (e.g., title 40 of the Code of Federal Regulations) that do not allow any amount of liquid fuel to expel from the fuel fill apparatus during a filling event. To prevent liquid fuel expulsion from the opening of the fuel fill apparatus, the example fuel fill apparatus disclosed herein employ a nozzle positioning apparatus. More specifically, the nozzle positioning apparatus positions a fuel nozzle (e.g., a fuel nozzle outlet) in an opening of the fuel fill apparatus in both an axial direction along a longitudinal axis of a fuel fill passageway and radially relative to the longitudinal axis and/or the fuel fill passageway. In particular, the positioning apparatus maintains a fuel nozzle outlet opening substantially parallel relative to a longitudinal axis of the fuel fill apparatus.

Additionally or alternatively, the positioning apparatus of the example fuel fill apparatus disclosed herein maintains an aspirator or sensor of the fuel nozzle substantially parallel to and/or adjacent an inner surface or wall of the fuel fill passageway to prevent premature shut-off of fuel flow from the fuel nozzle during a filling event. In some examples, the fuel fill apparatus employs a deflector to deflect or guide fuel vapors away from the aspirator or sensor to significantly increase the accuracy of the aspirator, thereby preventing or significantly reducing premature shut-offs. Additionally or alternatively, the example fuel fill apparatus disclosed herein may include a nozzle retention apparatus that retains a fuel fill nozzle engaged with the fuel fill apparatus (e.g., via interference) without assistance from an operator or owner of the marine vehicle.

As used herein, the term "fluid" encompasses, but is not limited to, a liquid such as fuel (e.g., gasoline), a vapor such as fuel vapor (e.g., gasoline vapor), a gas (e.g., air) and/or any combination or mixture thereof.

FIG. 1 illustrates an example marine fuel delivery system 100 having an example fuel fill apparatus 102 in accordance with the teachings disclosed herein. The example fuel delivery system 100 of FIG. 1 includes a fuel tank 104 that is to be permanently mounted to a marine vehicle. However, in other examples, the fuel tank 104 may be a portable fuel tank (i.e., non-permanently mounted). The fuel tank 104 has a cavity or reservoir 106 to receive liquid fuel via the fuel fill apparatus 102. In the illustrated example, the fuel tank 104 is a direct fill tank that relies on direct insertion of a fuel nozzle into the fuel tank 104 via the fuel fill apparatus 102.

The fuel delivery system 100 includes a venting system 108 fluidly coupled to the fuel tank 104 to equalize a pressure in the fuel tank 104 and/or to accommodate volumetric changes (e.g., expansion) in the fuel tank 104. For example, when the pressure of fuel and/or vapors in the fuel tank 104 increases, fuel vapors are released from the fuel tank 104 through the venting system 108. In other words, an increase in pressure in the fuel tank 104 causes fuel vapors (e.g., containing hydrocarbons) in the fuel tank 104 to vent or release to the atmosphere. Further, the example fuel delivery system 100 of FIG. 1 includes evaporative emission controls such as a vapor collection apparatus 110 to meet or satisfy government diurnal emissions regulations (e.g., EPA regulations). For example, the vapor collection apparatus 110 includes an emission(s)-capturing or filter material (e.g., an adsorbent material) such as, for example, activated carbon, charcoal, etc., that passively filters emissions by collecting and storing evaporative emissions such as, for example, hydrocarbons in fuel vapors venting to the atmosphere to reduce pollution to the environment. Thus, the fuel delivery system 100 includes diurnal emission controls to reduce the amount of emissions (e.g., hydrocarbons) released to the environment during, for example, a diurnal cycle.

Further, the example fuel fill apparatus 102 satisfies current fueling regulations for marine fuel systems promulgated by federal regulations (e.g. EPA fueling regulations). In particular, the example fuel fill apparatus 102 prevents liquid fuel expulsion onto a deck of a marine vehicle or overboard via the fuel fill apparatus 102 during a fueling event. The example fuel fill apparatus 102 enables refueling at flow rates in excess of 10 gallons per minute and provides a clean shut-off without any spitback, wellback and/or expulsion of liquid fuel.

Additionally or alternatively, the example fuel fill apparatus 102 significantly reduces or prevents premature nozzle shut-off during a fueling event to increase refueling performance. In particular, the fuel fill apparatus 102 prevents or significantly reduces premature shut-off during a fueling event. In other words, the fuel fill apparatus 102 prevents premature shut-off of fuel flow prior to a predetermined fill level or condition 112 of liquid fuel is achieved.

Figure 2:
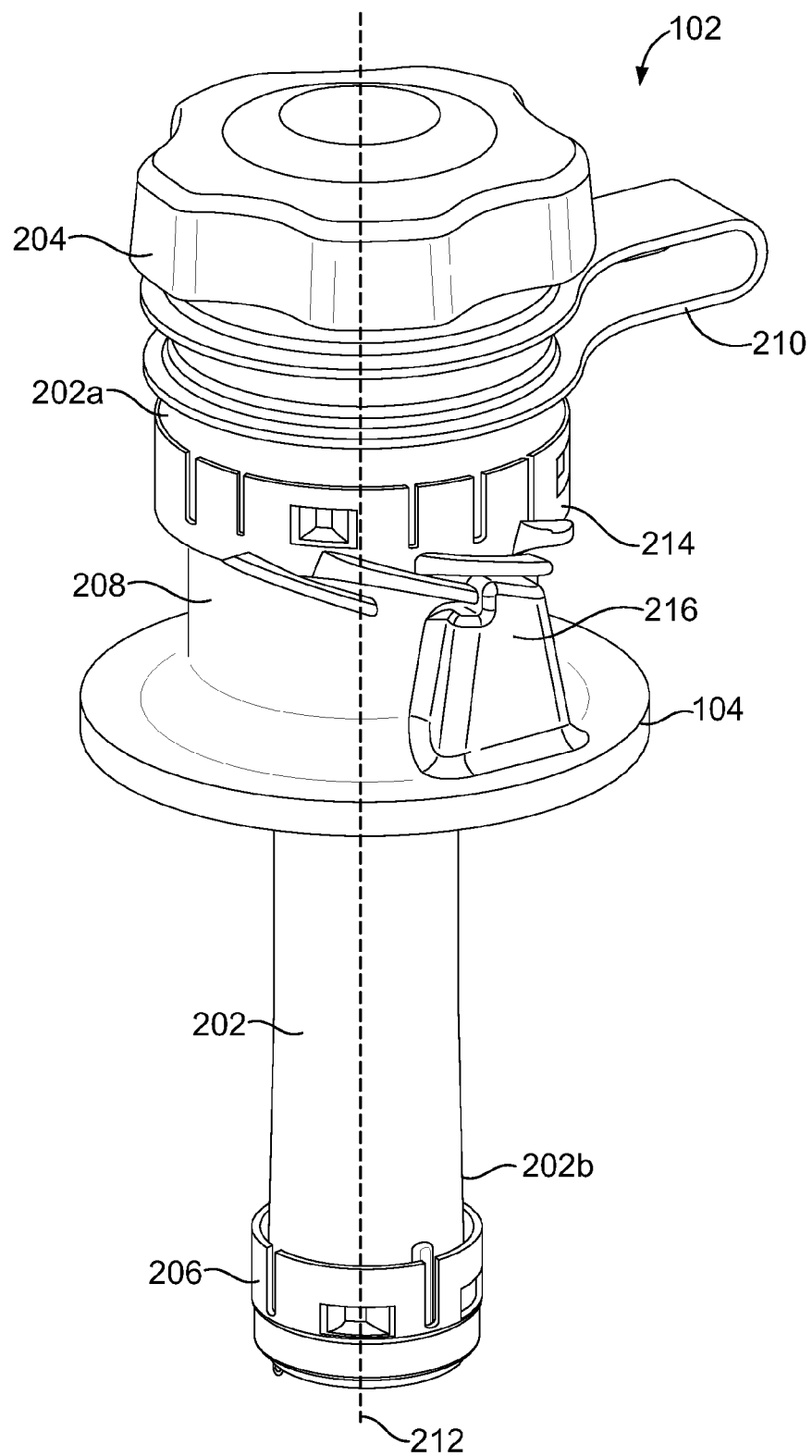
FIG. 2 is a perspective view of the example fuel fill apparatus of FIG. 1.

FIG. 2 is a perspective view of the example fuel fill assembly or apparatus 102 of FIG. 1. The example fuel fill apparatus 102 includes a body 202, a fuel cap 204 coupled to a first end 202a of the body 202 and an inlet control valve 206 coupled to a second end 202b of the body 202. More specifically, the body 202 removably couples the fuel fill apparatus 102 to a neck 208 of the fuel tank 104 via, for example, threads. Thus, the fuel fill apparatus 102 is coupled directly to the neck 208 of the fuel tank 104 to provide a direct fill fuel tank. A tether 210 retains the fuel cap 204 attached to the body 202 when the fuel cap 204 is removed from the body 202.

As shown in the illustrated example, the body 202 is inserted in the neck 208 of the fuel tank 104. In addition, to hold or maintain a position of the fuel fill apparatus 102 relative to the fuel tank 104 about a longitudinal axis 212 when the fuel cap 204 is removed or coupled to the body 202, the fuel fill apparatus 102 employs a retainer or lock 214. More specifically, the retainer 214 engages a locking tab 216 formed in the fuel tank 104 adjacent the neck 208 to prevent rotation of the body 202 relative to the fuel tank 104 about the longitudinal axis 212. In other words, the retainer 214 and locking tab 216 prevent back-off of the fuel fill apparatus 102 relative to the fuel tank 104 when the fuel cap 204 is removed and/or attached to the body 202.

Further, the body 202 or the fuel fill apparatus 102 mounts to existing tank neck geometries and seals to existing fuel tanks. As a result, the example fuel fill apparatus 102 provides compliance with federal fueling regulations without requiring significant tooling changes to existing fuel tank tooling (e.g., the molds). In some examples, the example fuel fill apparatus 102 may retrofit existing fuel tanks in the field. For example, the body 202 may be configured to mount directly to conventional 2¼ inch buttress threads on existing or known fuel tanks. In the examples in which the retainer 214 is employed, a tooling change may be needed in the area adjacent the neck 208 to provide the lock tab 216. As a result, the example fuel fill apparatus 102 significantly reduces manufacturing costs while providing compliance with current marine fuel system federal regulations.

As shown in the illustrated examples, the fuel fill apparatus 102 provides an insert that couples to the neck 208 of the fuel tank 104. However, in other examples, the body 202 and/or a portion of the body 202 may be integrally formed with the neck 208 of the fuel tank 104. For example, a fuel fill passageway described in connection with FIG. 4 may be integrally formed with the neck 208 of the fuel tank 104 as a unitary piece or structure.

Figure 3:
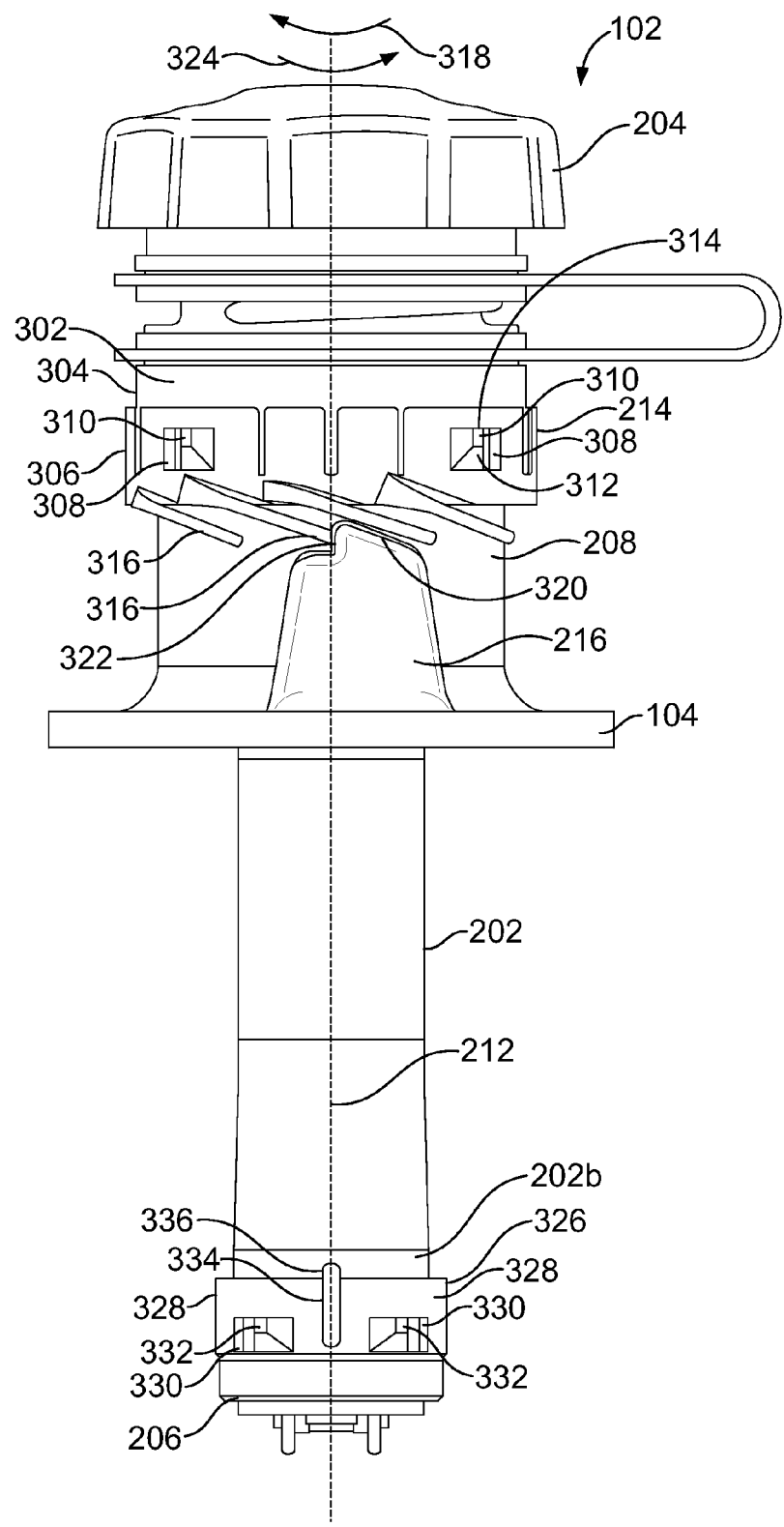
FIG. 3 is a side view of the example fuel fill apparatus of FIGS. 1 and 2.

FIG. 3 is a side view of the example fuel fill apparatus 102 of FIGS. 1 and 2. Referring to FIG. 3, the retainer 214 is coupled to an outer surface 302 of an annular flange 304 of the body 202 via a snap-fit connection. The retainer 214 includes a base 306 having a plurality of openings 308 to engage protruding ridges or tabs 310 formed on the outer surface 302. The ridges or tabs 310 protrude in a direction substantially perpendicular relative to the longitudinal axis 212 of the fuel fill apparatus 102. Further, each of the protruding ridges or tabs 310 may include a slanted or angled surface 312 to facilitate coupling of the retainer 214 to the body 202 and a shoulder 314 to maintain, hold or lock the position of the base 306 relative to the body 202.

In addition, the retainer 214 includes a plurality of flexible fingers, clips or tabs 316 extending from the base 306 at an angle (e.g., a downward angle in the orientation of FIG. 3) relative to the base 306 and/or the longitudinal axis 212 of the fuel fill apparatus 102. As the body 202 is rotated in a first direction 318 about the longitudinal axis 212 relative to the neck 208 to couple the fuel fill apparatus 102 to the fuel tank 104, the flexible fingers 316 flex or bend in a direction toward the fuel cap 204 (e.g., an upward direction in the orientation of FIG. 3) when the flexible fingers 316 engage a tapered or angled surface 320 of the locking tab 216. As the flexible fingers 316 disengage the tapered surface 320, the flexible fingers 316 move to a relaxed or non-stressed position in a direction away from the fuel cap 204 (e.g., or a downward direction) to engage a stop or wall 322 (e.g., a substantially vertical wall) of the locking tab 216. The wall 322 of the locking tab 216 is substantially parallel relative to the longitudinal axis 212. When engaged with the wall 322, the flexible fingers 316 prevent rotation of the body 202 relative to the fuel tank 104 in a second direction 324 about the longitudinal axis 212 to prevent back-off of the body 202 relative to the neck 208 of the fuel tank 104. Thus, after the fuel fill apparatus 102 is coupled to the neck 208 of the fuel tank 104, the fuel fill apparatus 102 may be removed from the fuel tank 104 for maintenance or servicing by lifting or otherwise moving the flexible fingers 316 out of engagement with the wall 322 of the locking tab 216. Thus, the body 202 does not decouple or detach from the neck 208 during removal and/or attachment of the fuel cap 204 relative to the body 202. In other examples, the retainer 214 may be any other suitable lock or latch mechanism. However, in some examples, the retainer 214 and/or the locking tab 216 may not be employed.

As shown in FIG. 3, the inlet control valve 206 is coupled to the second end 202b of the body 202 via a snap-fit connection. More specifically, the inlet control valve 206 includes a housing 326 having one or more flexible fingers, clips or tabs 328 that include openings 330. The openings 330 of the flexible fingers 328 receive respective protruding ridges or tabs 332 (e.g., configured similar to the tabs 310) that protrude from the body 202 to couple the housing 326 to the second end 202b of the body 202 via the snap-fit connection. Additionally or alternatively, the housing 326 may include a slot 334 positioned between the flexible fingers 328 to receive a keyed tab 336 formed on the body 202. The slot 334 engages or aligns with keyed tab 336 to properly orient or position the inlet control valve 206 relative to the body 202. In other examples, the inlet control valve 206 and/or the retainer 214 may be coupled to the body 202 via any other suitable fastener(s).

Figure 4:
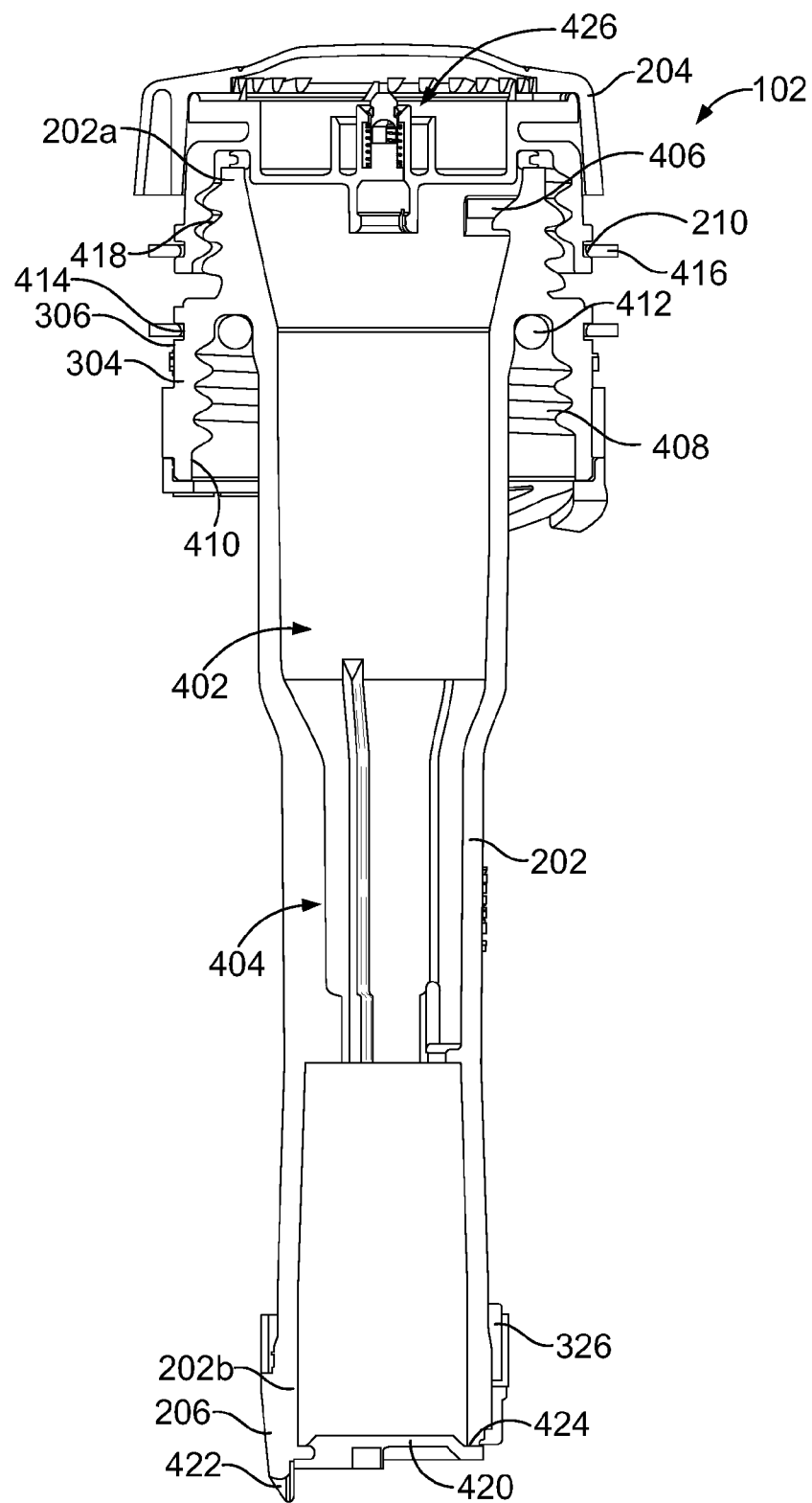
FIG. 4 is a cross-sectional view of the example fuel fill apparatus of FIGS. 1-3.

FIG. 4 is a cross-sectional view of the example fuel fill apparatus 102 of FIGS. 1-3. The body 202 of the fuel fill apparatus 102 defines an opening or fuel fill passageway 402 to receive, for example, a fuel nozzle of a fuel pump and guide liquid fuel from the fuel nozzle to the cavity 106 (FIG. 1) of the fuel tank 104 (FIG. 1). The fuel fill passageway 402 extends between the first end 202a of the body 202 and the second end 202b of the body 202. As described in greater detail below in connection with FIGS. 6-11, the fuel fill passageway 402 includes a positioning apparatus or positioner 404 and a nozzle retention apparatus or nozzle retainer 406. The positioning apparatus 404 positions or orients a fuel nozzle in the fuel fill passageway 402 to prevent premature shut-off of an automatic fuel nozzle when fueling the fuel tank 104, and nozzle retention apparatus 406 allows for hands-free fueling during a fueling event.

The body 202 of the fuel fill apparatus 102 employs a first set of threads 408 to removably couple the body 202 or the fuel fill apparatus 102 to the neck 208 (FIG. 2) of the fuel tank 104. More specifically, the first set of threads 408 is formed on an inner surface 410 of the annular flange 304 of the body 202. A seal 412 (e.g., an O-ring) provides a tight seal between the fuel tank 104 and the body 202 when the body 202 is coupled to the neck 208 of the fuel tank 104. The annular flange 304 also includes an annular groove 414 to retain a first end 416 of the tether 210.

The body 202 includes a second set of threads 418 to removably couple the fuel cap 204 to the body 202. The fuel cap 204 is removed from the body 202 to allow access to the fuel fill passageway 402 and is coupled to the body 202 to cover or restrict access the fuel fill passageway 402.

As noted above, the inlet control valve 206 is coupled or attached to the second end 202b of the body 202. The inlet control valve 206 includes a flow control member or disc 420 pivotally or hingeably coupled to the housing 326 of the inlet control valve 206. The inlet control valve 206 includes a biasing element 422 (e.g., a spring) to bias the flow control member 420 to a closed position (as shown in FIG. 4) at which the flow control member 420 engages a valve seat 424 to prevent liquid fuel from flowing from the second end 202b of the body 202 (e.g., from the cavity 106 of the fuel tank 104 of FIG. 1) toward the first end 202a of the fuel fill passageway 402.

However, in the closed position, the inlet control valve 206 allows fuel vapors to flow from the second end 202b of the body 202 (e.g., from the cavity 106 of the fuel tank 104) to the first end 202a of the body 202. The fuel cap 204 of the illustrated example employs the pressure relief valve 426 to allow fuel vapors in the fuel tank 104 to vent to the atmosphere when a pressure in the fuel tank 104 is greater than a pre-set pressure value set or provided by the pressure relief valve 426 and prevents fuel vapors from venting to the atmosphere when a pressure in the fuel tank 104 is less than the pre-set pressure value.

Figure 5:
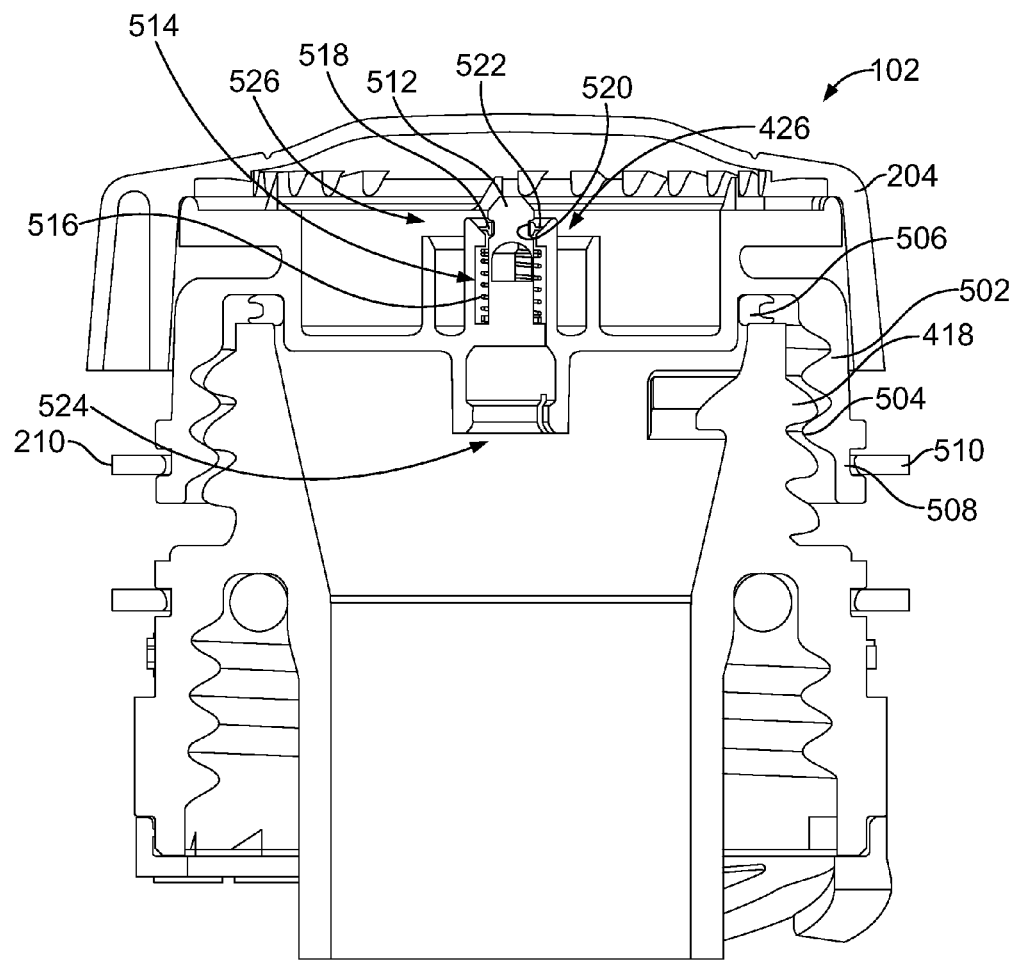
FIG. 5 is an enlarged cross-sectional view of the example fuel fill apparatus of FIG. 4.

FIG. 5 is an enlarged cross-sectional view of the fuel fill apparatus 102 of FIG. 4. As shown in FIG. 5, the fuel cap 204 of the illustrated example includes an annular flange 502 having threads 504 to threadably engage the threads 418 of the body 202. The fuel cap 204 employs a seal 506 (e.g., an O-ring) to provide a relatively tight seal between the fuel cap 204 and the body 202 (e.g., between the threads 418 of the body 202 and the threads 504 of the fuel cap 204) when the fuel cap 204 is coupled to the body 202. The annular flange 502 includes an annular groove 508 to receive a second end 510 of the tether 210.

The fuel cap 204 includes the pressure relief valve 426 to restrict venting the fuel vapors that flow to the fuel cap 204 from the cavity 106 of the fuel tank 104 when the inlet control valve 206 is in a closed position. The pressure relief valve 426 includes a poppet 512 disposed in a chamber or flow path 514 and is biased in a closed position as shown in FIG. 5 via a biasing element 516 (e.g., a spring). The poppet 512 includes a seal or O-ring 518 positioned in a groove 520 of the poppet 512 that sealingly engages a valve seat 522 to prevent fluid flow (i.e., fuel vapors) across the flow path 514 between the cavity 106 of the fuel tank 104 and the atmosphere when the pressure relief valve 426 is in the closed position.

As the pressure in the fuel tank 104 increases, the pressure imparts a force to a first or tank side 524 of the poppet 512. When the force imparted by the pressure in the fuel tank 104 is greater than a force imparted to the poppet 512 by the biasing element 516, the poppet 512 moves in a direction toward the fuel cap 204. As a result, the seal 518 disengages or moves away from the valve seat 522 to allow fuel vapors to flow through the flow path 514 to a second or atmospheric side 526 of the pressure relief valve 426 to allow the fuel vapors to vent to the atmosphere. During operation of a marine vehicle and/or during a diurnal cycle, although fuel vapors typically vent to the atmosphere via the venting system 108 (FIG. 1), the pressure relief valve 426 allows the flow of gasses or fuel vapors when the pressure in the fuel tank 104 (FIG. 1) is more than a predetermined value (e.g., 1 psi, 5 psi) greater than the atmospheric pressure (e.g., provides a safety relief valve). For example, the predetermined pressure value may correspond to a spring force provided by the biasing element.

Figure 6:
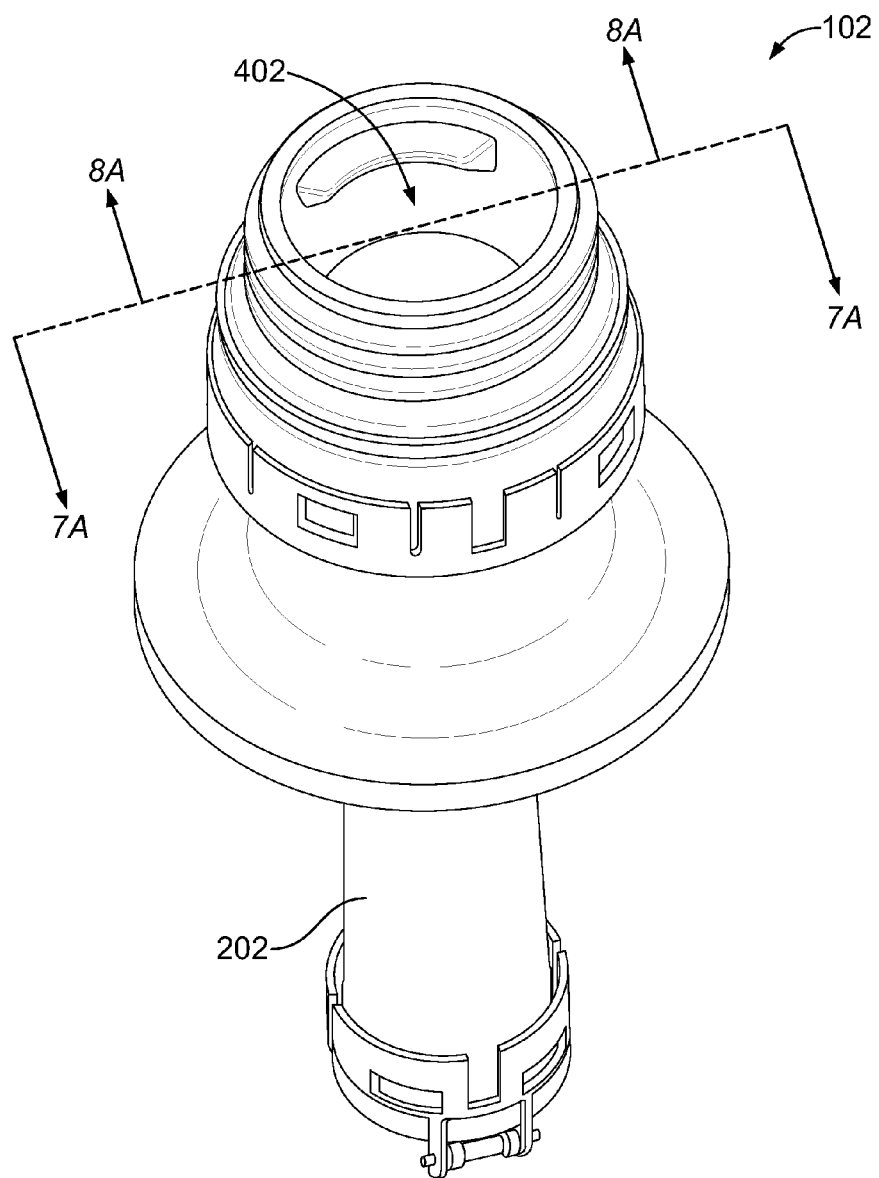
FIG. 6 illustrates a perspective view of the example fuel fill apparatus of FIGS. 1-5 having a fuel cap removed.
Figure 7:
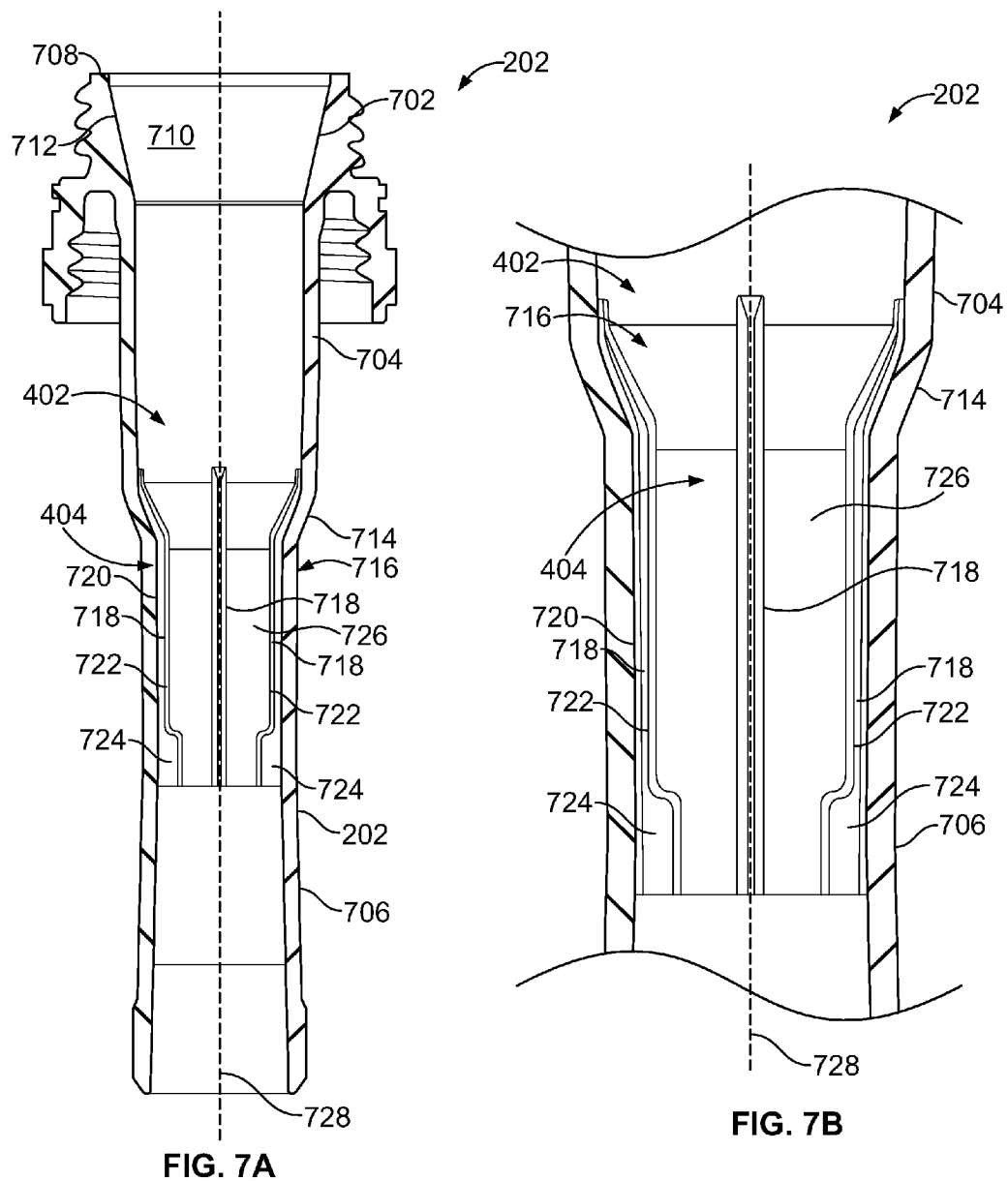
FIG. 7A is a cross-sectional view of an example body of the fuel fill apparatus of FIGS. 1-6 taken along line 7A-7A of FIG. 6.
FIG. 7B is an enlarged view of the example body portion of FIG. 7A.
Figure 8:
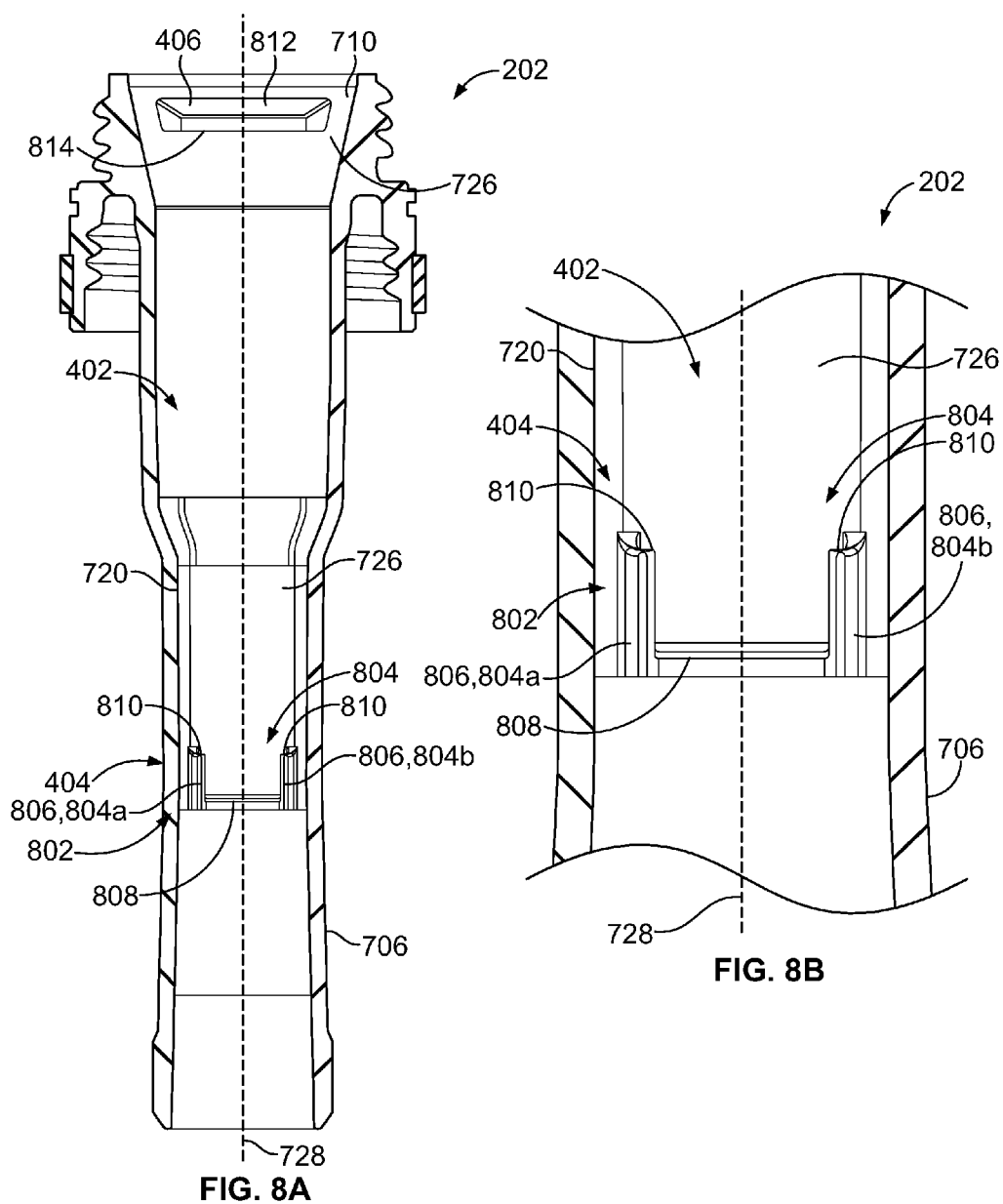
FIG. 8A is cross-sectional view of the example body of the fuel fill apparatus of FIGS. 1-6 taken along line 8A-8A of FIG. 6.
FIG. 8B is an enlarged view of the example body of FIG. 8A.

FIG. 6 is a perspective view of the example fuel fill apparatus 102 of FIGS. 1-5 showing the fuel cap 204 removed to provide access to the fuel fill passageway 402 of the body 202.

FIG. 7A is a cross-sectional view of the example body 202 of FIGS. 1-6 taken along line 7A-7A of FIG. 6. FIG. 7B is an enlarged view of the body 202 of FIG. 7A. Referring to FIGS. 7A and 7B, the body 202 defines the fuel fill passageway 402. The fuel fill passageway 402 of the illustrated example includes a first portion 702, a second portion 704 and a third portion 706. The first portion 702 has a first diameter adjacent an edge 708 of the body 202, the second portion 704 has a second diameter smaller than the first diameter and the third portion 706 has a third diameter smaller than the second diameter. More specifically, the first portion 702 defines a throat area 710 of the fuel fill passageway 402 and has a varying diameter between the edge 708 of the body 202 and the second portion 704 to provide a first transition 712 (e.g., a tapered or angled transition) and the body 202 defines a second transition 714 (e.g., a tapered or angled transition) to couple the second and third portions 704 and 706. The first, second and third portions 702, 704 and 706 are integrally formed as a unitary structure or body.

FIGS. 7A and 7B illustrate a first portion 716 of the positioning apparatus 404 of the body 202. The first portion 716 of the positioning apparatus 404 includes a first plurality of longitudinal projections or ribs 718 radially and circumferentially positioned about a portion of a circumference of an inner wall 720 defined by the fuel fill passageway 402. The first plurality of ribs 718 includes a first portion or a body 722 and a second portion or a lip 724 adjacent the body 722. More specifically, the first plurality of ribs 718 project from a surface 726 of the inner wall 720 of the fuel fill passageway 402 toward a central axis 728 of the body 202. The lip 724 extends a distance from the surface 726 of the inner wall 720 toward the central axis 728 that is greater than a distance in which the body 722 of the first plurality of ribs 718 extends from the surface 726 toward the central axis 728. In the illustrated example, the first plurality of ribs 718 is formed along or extends longitudinally between the second portion 704, the second transition 714 and the third portion 706. However, in other examples, the first plurality of ribs 718 may extend longitudinally along the third portion 706 of the fuel fill passageway 402.

FIG. 8A is a cross-sectional view of the body 202 of FIGS. 1-6 taken along line 8A-8A of FIG. 6. FIG. 8B is an enlarged view of the body 202 of FIG. 8A. FIGS. 8A and 8B illustrate a second portion 802 of positioning apparatus 404. The second portion 802 of the positioning apparatus 404 includes a second plurality of longitudinal projections or ribs 804 radially and circumferentially positioned about a portion of the circumference of the inner wall 720 defined by the fuel fill passageway 402. In particular, the second plurality of ribs 804 is positioned adjacent the first plurality of ribs 718 (FIGS. 7A and 7B).

The second plurality of ribs 804 defines a lip 806 that projects from the surface 726 of the inner wall 720 toward the central axis 728 of the body 202. The lip 806 of the second plurality of ribs 804 extends a distance between the surface 726 of the inner wall 720 toward the central axis 728 that is substantially similar to a distance by which the lip 724 of the first plurality of ribs 718 (FIGS. 7A and 7B) extends from the surface 726 toward the central axis 728. In this manner, the lips 724 and 806 engage an end of a fuel nozzle when the fuel nozzle is inserted in the fuel fill passageway 402 to help support the fuel nozzle and properly position the nozzle in the fuel fill passageway 402 in an axial direction substantially parallel relative the central axis 728. In the illustrated example, the second plurality of ribs 804 has a length that is substantially shorter than a length of the first plurality of ribs 718 (FIG. 7A). More specifically, the second plurality of ribs 804 has a longitudinal length that is substantially similar to a longitudinal length of the lip 724 of the first plurality of ribs 718 (FIGS. 7A and 7B). In the illustrated example, the second plurality of ribs 804 is formed in the third portion 706 of the fuel fill passageway 402.

Additionally or alternatively, the second portion 802 of the positioning apparatus 404 includes a wall, deflector or projection 808 extending between first and second ribs 804a and 804b of the second plurality of ribs 804. The wall 808 is positioned underneath an upper surface 810 of the ribs 804a and 804b and extends along a portion of the inner wall 720 in a direction substantially perpendicular to the central axis 728 to interconnect the first and second ribs 804a and 804b. The wall 808 projects from the surface 726 of the inner wall 720 toward the central axis 728 of the body 202. As shown, the wall 808 is integrally formed with the second plurality of ribs 804. As described below, the wall 808 helps prevent premature nozzle shut-off during a filling event.

As shown in FIG. 8A, the body 202 also includes the fuel nozzle retention apparatus 406 disposed or positioned in the throat area 710 of the fuel fill passageway 402. In this example, the nozzle retention apparatus 406 is integrally formed with the body 202. In particular, the nozzle retention apparatus 406 protrudes from the surface 726 of the inner wall 720 toward the central axis 728 of the body 202. In this example, the nozzle retention apparatus 406 includes an angled or tapered lead-in surface 812 and a shoulder 814. As shown, the nozzle retention apparatus 406 is aligned with the second plurality of ribs 804 and/or the wall 808.

The positioning apparatus 404 and the fuel nozzle retention apparatus 406 of the illustrated example are formed with the body 202 as a unitary piece or structure. For example, the positioning apparatus 404 and/or the fuel nozzle retention apparatus 406 may be formed via, for example, machining. However, in other examples, the positioning apparatus 404 and/or the nozzle retention apparatus 406 may be coupled to the body 202 via, for example, fasteners. For example, the positioning apparatus 404 may be formed via a sleeve insert that is disposed or positioned (e.g., slid) into an opening of the body 202 to define the fuel fill passageway 402. In yet other examples, the positioning apparatus 404 is integrally formed with a neck (e.g., the neck 208) of a fuel tank (e.g., the fuel tank 104).

Figure 9:
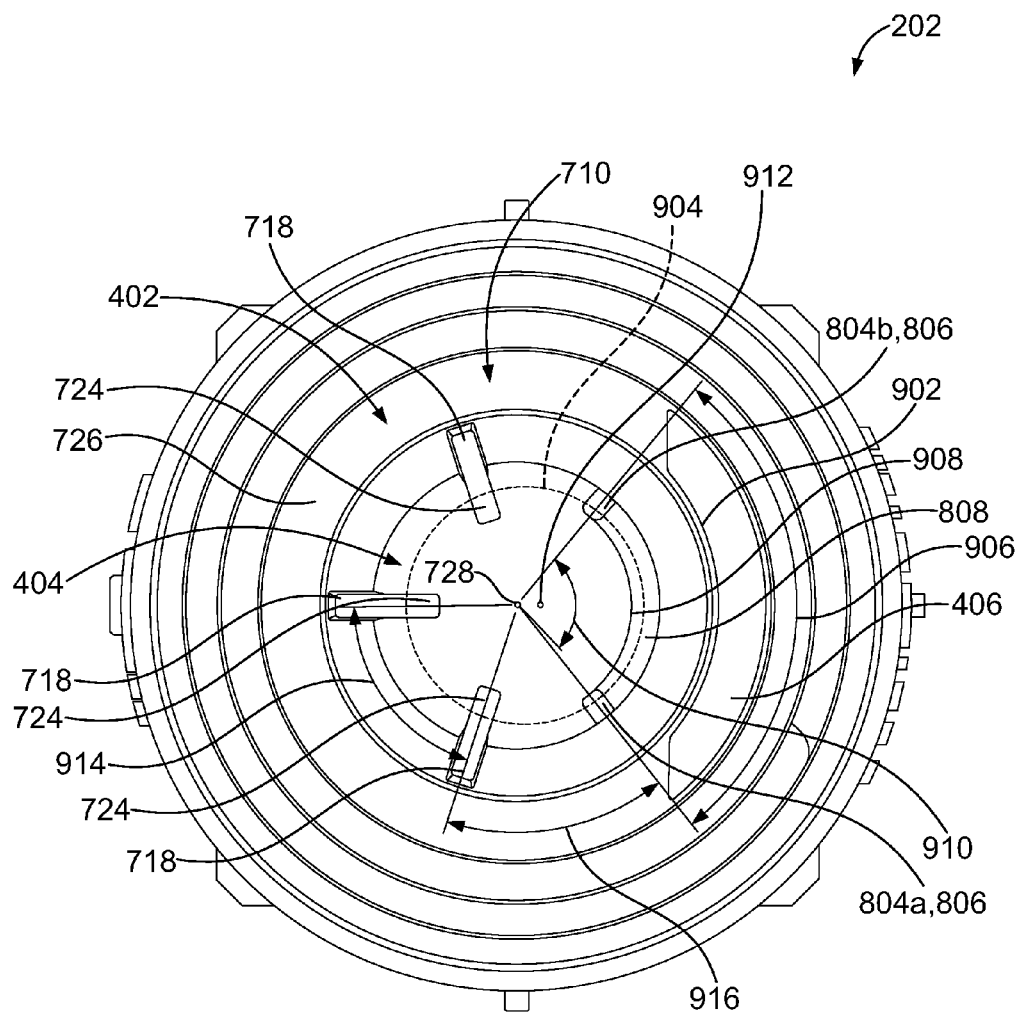
FIG. 9 is a plan view of the example body of the fuel fill apparatus of FIGS. 1-6, 7A and 8A.

FIG. 9 illustrates a plan view of the body 202 of FIGS. 1-6, 7A and 8A. As most clearly shown in FIG. 9, the nozzle retention apparatus 406 may include a curved or arcuate (e.g., a semi-circular) edge or surface 902 having a radius of curvature coaxially aligned with the central axis 728. Such a curved profile provides a larger throat area 710. Maximizing the area of the throat 710 (e.g., the diameter of the first portion 702 of the fuel fill passageway 402) facilitates insertion of a nozzle 904 within the fuel fill passageway 402. As shown, an angle or spacing 906 between a first end of the curved surface 902 and the second end of the curved surface 902 may be, for example, between approximately 60 and 180 degrees or, more specifically, approximately 110 degrees. In other examples, the nozzle retention apparatus 406 may include any other suitable shape(s) or size(s).

The wall 808 may also include a curved or arcuate edge or surface 908 (e.g., a semi-circular edge) having a radius of curvature coaxially aligned with the central axis 728. The arcuate edge 908 prevents interference with a fluid flow exit of the nozzle 904 when the nozzle 904 is positioned in the fuel fill passageway 402. As shown, an angle or spacing 910 between a first end of the arcuate edge 908 (or the rib 806a) and a second end of the arcuate edge 908 (or the rib 806b) may be, for example, between approximately 60 and 180 degrees or, more specifically, approximately 110 degrees.

The first and second plurality of ribs 718 and 804 are radially spaced about a circumference of the fuel fill passageway 402. More specifically, the ribs 718 and 804 are radially spaced to offset a central axis 912 the nozzle 904 relative to the central axis 728 of the body 202 when the nozzle 904 is inserted in the fuel fill passageway 402. In particular, the body 722 of the first plurality of ribs 718 is dimensioned or configured to direct, guide or offset the nozzle 904 toward the second plurality of ribs 804 and/or the wall 808. The lips 724 and 806 of the respective first and second plurality of ribs 718 and 804 engage an end of the nozzle 904 to prevent further insertion of the nozzle 904 in the fuel fill passageway 402.

The first plurality of ribs 718 may be spaced apart by an angle 914 between approximately 30 to 90 degrees or, more specifically, approximately 45 degrees. An angle 916 between the first and second plurality of ribs 718 and 804 may be between approximately 30 and 75 degrees or, more specifically, approximately 35 degrees.

Figures 10A, 10B:
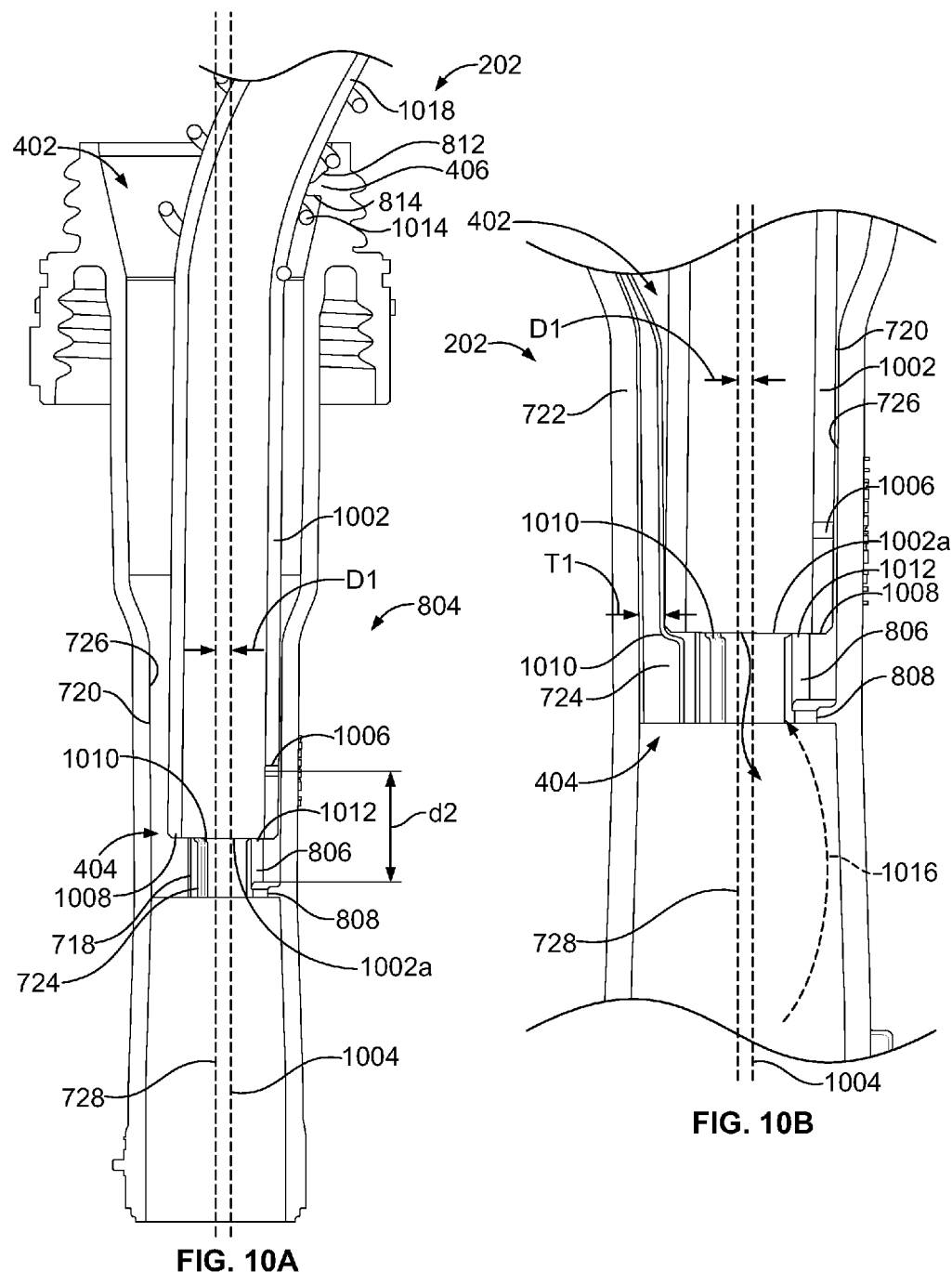
FIG. 10A illustrates the example body of FIGS. 1-6, 7A and 8A having an example fuel nozzle inserted in a fuel fill passageway of the body.
FIG. 10B is an enlarged cross-sectional view of the body of FIG. 10A.

FIG. 10A is a cross-sectional view of the body 202 showing a conventional automatic fuel nozzle 1002 inserted in the fuel fill passageway 402. FIG. 10B is an enlarged portion of the body 202 of FIG. 10A. Referring to FIGS. 10A and 10B, the fuel fill passageway 402 of the body 202 of the fuel fill apparatus 102 can receive the conventional nozzle 1002 as shown in FIGS. 10A and 10B, a vapor recovery bellows-type nozzle and/or any other type of known fuel pump nozzle(s).

When the nozzle 1002 is inserted in the fuel fill passageway 402, the positioning apparatus 404 guides or positions the nozzle 1002 in the fuel fill passageway 402 such that a central axis 1004 of the nozzle 1002 or the fuel nozzle outlet 1002a is offset relative to the central axis 728 of the body 202. More specifically, the first plurality of ribs 718 causes the nozzle 1002 to offset relative to the central axis 728 a distance $D_1$ provided by a thickness $T_1$ (FIG. 10B) of the body 722 of the first plurality of ribs 718. In particular, the first plurality of ribs 718 offsets the nozzle 1002 relative to the central axis 728 toward the second plurality of ribs 804 such that an aspirator or sensor 1006 of the nozzle 1002 is positioned or substantially aligned relative the wall 808. The offset $D_1$ also causes the aspirator 1006 to be positioned near the surface 726 of the inner wall 720. In addition, the plurality of ribs 718 aligns the nozzle 1002 relative to the passageway 402 to maintain the central axis 1004 of the nozzle 1002 and/or the nozzle outlet 1002a substantially parallel relative to the central axis 728. In this manner, the outlet 1002a remains substantially parallel relative to the central axis 728.

Further, when the nozzle 1002 is inserted in the fuel fill passageway 402, an end 1008 of the nozzle 1002 engages upper surfaces 1010 and 1012 of the respective lips 724 and 806 to provide a stop and prevent further insertion of the nozzle 1002 in the fuel fill passageway 402. The lips 718 and 806 also position the aspirator 1006 at least a distance $D_2$ above the wall 808.

As shown in FIG. 10A, the nozzle retention apparatus 406 engages a retention feature 1014 (e.g., a ring or a collar) of the nozzle 1002 to retain the nozzle 1002 coupled to the body 202 during a filling event. The retention feature 1014 is often standard on conventional nozzles. In particular, when an operator inserts the nozzle 1002 within the fuel fill passageway 402, the tapered surface 812 of the nozzle retention apparatus 406 guides or directs the retention feature 1014 toward the shoulder 814. The nozzle retention apparatus 406 retains the nozzle 1002 within the fuel fill passageway 402 of the body 202 via interference when the shoulder 814 engages the retention feature 1014.

As a result, the nozzle retention apparatus 406 provides or enables hands free operation of the nozzle 1002. For example, an operator can insert the nozzle 1002 within the fuel fill passageway 402, engage the automatic nozzle (not shown), and release a handle (not shown) of the nozzle 1002 during a fueling or filling event. Although not shown, the nozzle retention apparatus 406 may also retain a vapor recovery nozzle such as, for example, a stage 2 vapor recovery bellows-type nozzle within the fuel fill passageway 402 to allow for a hands free filling event.

Additionally or alternatively, the nozzle 1002 is captured between the nozzle retention apparatus 406 and the lips 724 and 806. Thus, in the illustrated example, the nozzle retention apparatus 406 and the lips 724 and 806 help maintain and/or position the nozzle 1002 substantially parallel relative to the central axis 728 to axially hold the position of the nozzle 1002 in a direction along the central axis 728.

Referring also to FIGS. 1-6, 7A, 8A and 9, during a filling event, the nozzle 1002 delivers fuel to the cavity 106 of the fuel tank 104. The liquid fuel causes the flow control member 420 of the inlet control valve 206 to pivot against the bias of the spring 422 to an open position to allow the liquid fuel to flow into the cavity 106 of the fuel tank 104. The pressure inside the fuel tank 104 increases as the cavity 106 is filled with liquid fuel to, for example, the fill level 112.

During filling, the nozzle 1002 provides an automatic shut-off by causing a valve (not shown) of the fuel pump (not shown) to close and prevent fuel flow via the nozzle 1002 during a filling operation. More specifically, a sensor or valve detects a certain predetermined back-pressure within the fuel fill passageway 402 via the aspirator 1006 and automatically shuts off fuel flow before the fuel can accumulate sufficiently to overflow the fuel fill passageway 402. For example, the predetermined back-pressure may correspond to a volume of liquid fuel in the cavity 106 indicative of the liquid fuel being at the fill level 112 (e.g., a fully filled fuel tank). During a filling operation, automatic nozzles typically require a fuel tank pressure of less than 0.5 psi before the automatic shut-off feature triggers a shut-off.

Further, the positioning apparatus 404 and/or the retention apparatus 406 of the body 202 prevents or substantially reduces premature nozzle shut-off (i.e., fuel flow shut-off prior to the liquid fuel reaching the fill level 112). For example, premature nozzle shut-off can occur before the liquid fuel reaches the fill level 112 due to, for example, displacement of fuel vapors in the fuel fill passageway 402 toward the aspirator 1006 as the fuel tank 104 is being filled. The displaced fuel vapors cause the aspirator 1006 to sense a pressure that is greater than the pressure in the fuel tank 104 representative of a volume of liquid fuel in the cavity 106 that is less than the fill level 112 (e.g., liquid fuel being below a full fill line). As a result, the nozzle 1002 shuts-off fuel flow prior to filling the cavity 106 of the fuel tank 104 to the fill level 112.

The example positioning apparatus 404 and/or the nozzle retention apparatus 406 prevent the nozzle 1002 from sensing a back-pressure provided by the fuel vapors during a filling event that is not indicative and/or does not correspond to a volume of liquid fuel in the fuel tank 104 being at the fill level 112. To prevent premature shut-off, the positioning apparatus 404 and/or the retention apparatus 406 position the aspirator 1006 immediately adjacent the inner wall 720 and prevent the nozzle 1002 from tilting in the fuel fill passageway 402 relative to the central axis 728 by maintaining the aspirator 1006 substantially parallel relative to the central axis 728. As a result, such positioning of the aspirator 1006 in the fuel fill passageway 402 significantly increases the accuracy of the aspirator 1006. Additionally or alternatively, the wall 808 shields the aspirator 1006 by directing or deflecting fuel vapors 1016 (FIG. 10B) caused by back-pressure in the fuel fill passageway 402 away from the aspirator 1006. As a result, the aspirator 1006 senses or detects a back-pressure that more accurately reflects the pressure within the fuel tank 104. In other words, the wall 808 prevents the back-pressure in the fuel fill passageway 402 that is greater than a corresponding pressure representative of the fill level in the cavity 106 of the fuel tank 104 from being sensed by the aspirator 1006. When the aspirator 1006 senses a pressure in the fuel fill passageway 402 that indicates and/or correlates to a liquid fuel level in the cavity 106 being at, for example, the fill level 112, the aspirator 1006 triggers a shut-off to stop fuel flow from the nozzle 1002.

When fueling is complete, a user removes the nozzle 1002 from the fuel fill passageway 402. For example, a user can position an upper end 1018 of the nozzle 1002 away from the nozzle retention apparatus 406 to disengage the retention feature 1014 of the nozzle 1002 and allow the user to pull the nozzle 1002 out of the fuel fill passageway 402. A user can then reattach the fuel cap 204 to the body 202.

The body 202, the fuel cap 204, the retainer 214, and/or the inlet control valve 206 of the fuel fill apparatus 102 disclosed herein can be made of resinous materials such as, for example, polypropylene, nylon and/or any other suitable materials that are resistant to impact, fuel, weather, etc. In other examples, the body 202, the fuel cap 204, the retainer 214, and/or the inlet control valve 206 may be composed of a metal alloy material such as stainless steel, bronze, aluminum, and/or any other suitable materials that are resistant to impact, fuel, weather, etc.

Although certain apparatus, methods, and articles of manufacture have been described herein, the scope of coverage of this patent is not limited thereto. To the contrary, this patent covers all apparatus, methods, and articles of manufacture fairly falling within the scope of the appended claims either literally or under the doctrine of equivalents.

What is claimed is:

1. A fuel fill apparatus comprising:
   a body defining a fuel fill passageway having a first opening to define a throat area, a second opening to receive an end of a fuel nozzle, and a third opening to guide liquid fuel from the fuel nozzle to a cavity of a fuel tank, the first opening having a first axis, the second opening defining a second axis and the third opening defining a third axis, the first axis of the first opening and third axis of the third opening being coaxially aligned to define a central axis of the fuel fill passageway and the second axis of the second opening being parallel and offset relative to the first and third axes;
   a first plurality of longitudinal ribs;
   a second plurality of longitudinal ribs positioned adjacent the first longitudinal ribs, the first and second longitudinal ribs positioned in the fuel fill passageway to position the end of the fuel nozzle in the second opening of the fuel fill passageway such that a central axis of the end of the fuel nozzle is offset and parallel relative to the central axis of the fuel fill passageway and an aspirator of the fuel nozzle is positioned adjacent an inner wall of the fuel fill passageway when the fuel nozzle is inserted in the fuel fill passageway; and
   a deflector positioned in the fuel fill passageway adjacent an end of the first and second plurality of ribs to direct fuel vapors away from an aspirator of the fuel nozzle when the fuel nozzle is inserted in second opening of the fuel fill passageway.

2. The fuel fill apparatus of claim 1, wherein at least one of the first longitudinal ribs or the second longitudinal ribs include a lip to engage the end of the fuel nozzle when the fuel nozzle is inserted in the fuel fill passageway.

3. The fuel fill apparatus of claim 1, wherein the deflector is to direct fuel vapors away from the aspirator to prevent premature shut-off of the fuel nozzle during the fueling event.

4. The fuel fill apparatus of claim 1, further comprising a fuel cap removably coupled to the body, the fuel cap having a fluid control apparatus to allow fuel vapors to escape from the fuel tank when a pressure in the fuel tank is greater than a predetermined pressure value.

5. The fuel fill apparatus of claim 1, further comprising an inlet control valve coupled to the body, the inlet control valve to move to a closed position to prevent liquid fuel from flowing between the fuel tank and the first opening during a non-fueling event, and the inlet control valve to move to an open position to allow liquid fuel to flow to the cavity during the fueling event.

6. The fuel fill apparatus of claim 1, further comprising a lock having a flexible finger to engage a locking tab of the fuel tank to prevent the fuel fill apparatus from rotating relative to the fuel tank when a fuel cap is attached or removed from the body.

7. The fuel fill apparatus of claim 1, wherein the first opening has a first diameter, the second opening has a second diameter and the third opening has a third diameter, the first diameter being greater than the second diameter and the third diameter, the third diameter being greater than the second diameter and less than the first diameter.

8. The fuel fill apparatus of claim 7, wherein the first plurality of longitudinal ribs extend between the first opening and the second opening.

9. The fuel fill apparatus of claim 1, further comprising a nozzle retainer positioned in a throat area of the fuel fill passageway.

10. The fuel fill apparatus of claim 9, wherein the nozzle retainer protrudes from an inner surface of the first opening toward the first axis, the nozzle retainer to engage a retention feature of the fuel nozzle to retain the fuel nozzle in the fuel fill passageway.

11. The fuel fill apparatus of claim 1, further comprising a lock to prevent rotation of the body relative to the fuel tank when a fuel cap is coupled or removed relative to the body.

12. The fuel fill apparatus of claim 11, wherein the lock includes a flexible clip to engage a locking tab formed adjacent a neck of the fuel tank.

13. The fuel fill apparatus of claim 1, wherein at least a portion of the body is threaded to engage a marine tank thread.

14. The fuel fill apparatus of claim 1, wherein the body is mountable to a buttress thread or a modified buttress thread.

15. The fuel fill apparatus of claim 1, wherein the body is mountable to a 2.25 inch thread.

16. The fuel fill apparatus of claim 1, wherein the body is to removably couple to a neck of the fuel tank.

17. The fuel fill apparatus of claim 1, wherein the body is an insert mountable to a fuel neck of the fuel tank.

18. The fuel fill apparatus of claim 1, wherein the body is an insert to be at least partially positioned in a fuel neck opening of the fuel tank.

* * * * *